No. 662,851. Patented Nov. 27, 1900.
J. FLORENCE.
EXPANSIBLE PULLEY.
(Application filed Feb. 16, 1900.)
(No Model.)

WITNESSES:
INVENTOR
ATTORNEYS

UNITED STATES PATENT OFFICE.

JOHN FLORENCE, OF NEWNAN, GEORGIA, ASSIGNOR OF ONE-HALF TO OLIVER A. ROBBINS, OF CHARLOTTE, NORTH CAROLINA.

EXPANSIBLE PULLEY.

SPECIFICATION forming part of Letters Patent No. 662,851, dated November 27, 1900.

Application filed February 16, 1900. Serial No. 5,493. (No model.)

*To all whom it may concern:*

Be it known that I, JOHN FLORENCE, a citizen of the United States, residing at Newnan, in the county of Coweta and State of Georgia, have invented certain new and useful Improvements in Expansible Pulleys; and I do hereby declare the following to be a full, clear, and exact description of the invention, such as will enable others skilled in the art to which it appertains to make and use the same.

My invention relates to improvements in expansion-pulleys, and has for its object to provide an expansion-pulley which may be readily adjusted to increase or decrease the size of its periphery for the purpose of correspondingly increasing or decreasing the speed of the belt running over said pulley.

My invention consists in the novel construction hereinafter described and claimed and will be understood by reference to the accompanying drawings, wherein the same parts are indicated by the same letters of reference throughout the several views.

Figure 1:
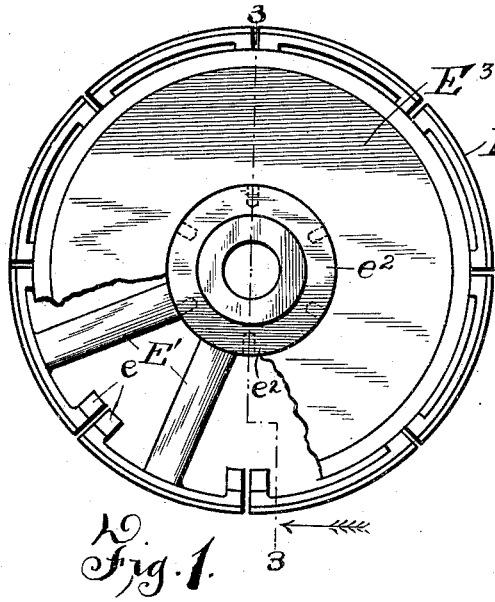
Figures 2, 3:
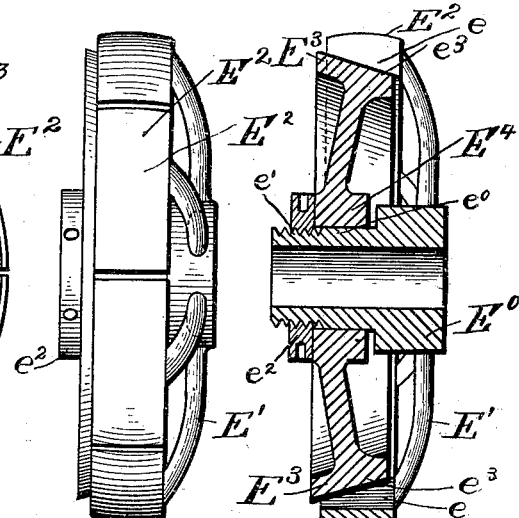
Figure 4:
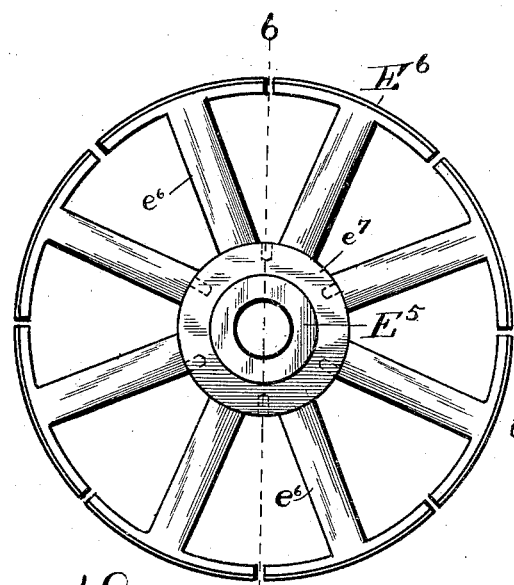
Figures 5, 6:
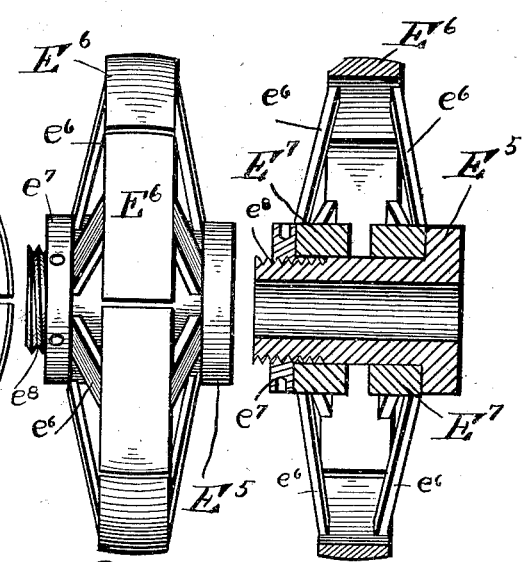

Figure 1 is a side view of one form of my expansion-pulley, parts being broken away for the sake of illustration. Fig. 2 is an edge view of the pulley shown in Fig. 1. Fig. 3 is a sectional view taken on the line 3 3 in Fig. 1 looking in the direction of the arrow. Fig. 4 is a view similar to Fig. 1, showing an expansion-pulley of a somewhat-modified construction from that shown in Fig. 1. Fig. 5 is an edge view of the pulley shown in Fig. 4, and Fig. 6 is a sectional view taken on the line 6 6 in Fig. 4 looking in the direction of the arrow.

Referring to Figs. 1, 2, and 3, the pulley therein shown consists of a central hub $E^0$, carrying flexible spokes $E'$, having a curvature, as shown, and the said spokes carrying each a segmental portion $E^2$ of the rim of the pulley. The inner sides of these segmental portions of the rim are provided with inclined lugs $e$, against which abuts a circular disk $E^3$, having a bevel periphery, as seen at $e^3$ in Fig. 3, the said circular disk having a head $E^4$, provided with a central opening fitting over a reduced portion $e^0$ of the hub $E^0$. The said reduced portion of the hub $E^0$ has a screw-threaded end at $e'$, upon which engages a screw-threaded nut $e^2$, by means of which the disk $E^3$ may be forced inwardly or allowed to move outwardly with relation to the sectional rim of the pulley. As the said nut $e^2$ is secured on the hub $E^0$ the disk causes the segment $E^2$, constituting the rim of the pulley, to extend; but upon being eased off the said segments are allowed to contract under the influence of the flexible spokes $E'$, as will be readily understood.

Instead of the form of pulley shown in Figs. 1 to 3 I may use a form of pulley such as is shown in Figs. 4 to 6, inclusive, wherein the hub $E^5$ of the pulley is separate, and each segment $E^6$ of the rim has two flexible spokes $e^6$ rigidly connected thereto. The said spokes $e^6$ are connected to two annular collars $E^7$, normally spaced a short distance apart and mounted upon the central hub $E^5$. These two collars $E^7$ are each solid or continuous, and by reason of the spokes $e^6$ being fixed to the segments of the rim and at their opposite ends to the said rings these parts may be said to be integral. The spokes diverge normally from their connection with the rim to the respective rings $E^7$, and the said spokes being of a resilient material allow the said rings to be compressed toward each other. These rings and the spokes connected thereto constitute the expander for the pulley-rim. The said collars are secured upon the hub by means of a screw-threaded nut $e^7$, engaging screw-threads $e^8$ upon the central hub $E^5$, as seen most clearly in Fig. 6. In this form of pulley the segmental rim thereof is expanded or contracted by screwing up or on loosening off the screw-threaded nut $e^7$ upon the screw-thread $e^8$, as desired.

The expansion-pulley hereinbefore described may be readily and quickly adjusted to either expand or contract the periphery thereof, as will be clearly seen.

I do not wish to limit myself to the precise details of construction herein described and shown in the accompanying drawings, as variations might be made which could be used without departing from the spirit of my invention.

Having thus described my invention, what I claim, and desire to secure by Letters Patent of the United States, is—

1. An expansion-pulley comprising a rim composed of segmental sections; flexible spokes fixed to said sections; a threaded hub; and nut engaging said hub for causing the expansion of said sections by compression, substantially as described.

2. An expansion-pulley comprising a rim composed of segmental sections; flexible spokes fixed to said sections; a threaded hub; an expander fitting within said rim; and a nut engaging said hub arranged to compress said expander within said rim, substantially as described.

In testimony whereof I affix my signature in presence of two witnesses.

JOHN FLORENCE.

Witnesses:
   J. F. LOVEJOY,
   CULVER SIMS.